INVENTOR
Gilbert Burrell
BY L. D. Burch
ATTORNEY

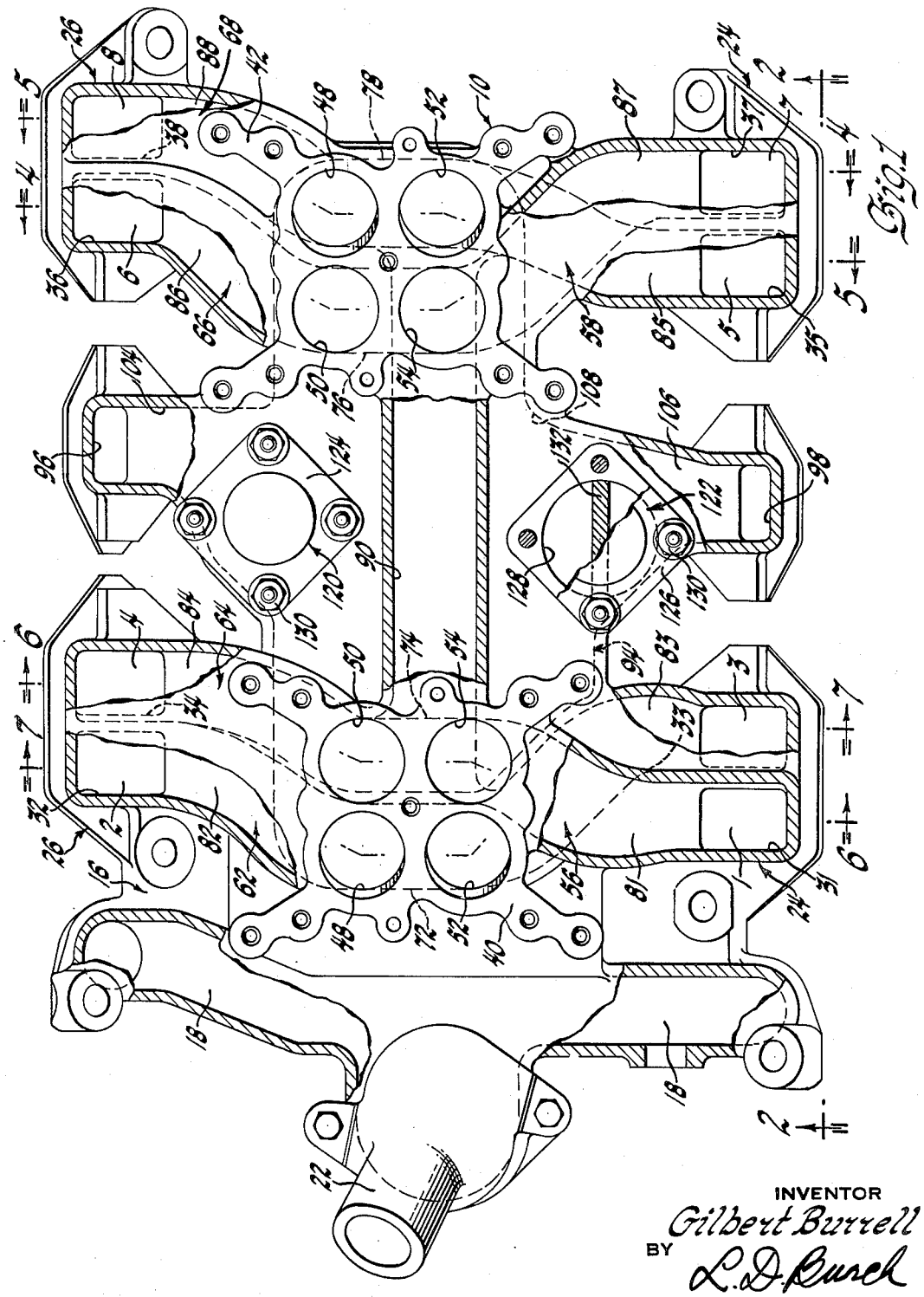

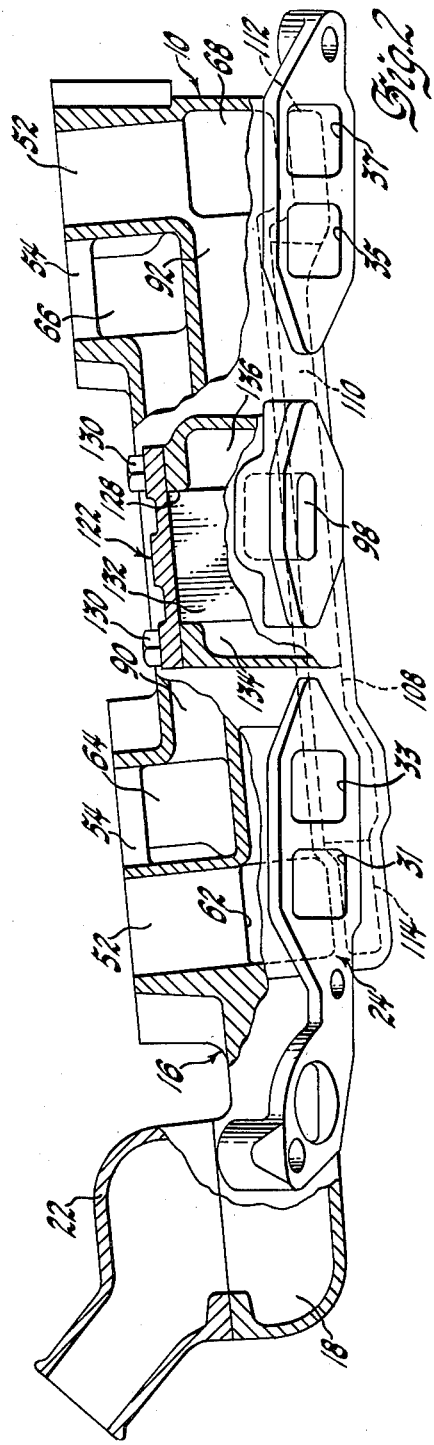

United States Patent Office 2,730,091
Patented Jan. 10, 1956

2,730,091

INTAKE MANIFOLD

Gilbert Burrell, Lansing, Mich., assignor to General Motors Corporation, Detroit, Mich., a corporation of Delaware Application January 20, 1954, Serial No. 405,105

20 Claims. (Cl. 123—122)

The present invention relates to charge forming means for supplying combustible fuel mixtures to the cylinders of an internal combustion engine and has particular relation to an intake manifold for use on V-type internal combustion engines employing a multiplicity of compound carburetors.

Numerous attempts have been made to improve the performance of internal combustion engines by increasing the volumetric efficiency thereof. One means of accomplishing this is to employ an intake manifold utilizing a plurality of compound carburetors. In V-type engines where the induction system is disposed between the two banks of cylinders, it is very difficult to provide an intake manifold having separate or independent distribution passages that allow the desired grouping of cylinders while still presenting substantially identical flow resistances to the fuel charges flowing to each of the cylinders. Any variations in the flow resistances of the passages may result in considerable variations in the fuel charges delivered to some of the cylinders during some engine operations. This problem is particularly acute where it is desired to employ a plurality of compound carburetors on a V-type engine.

It is proposed to provide an intake manifold for employing a multiplicity of compound carburetors in which each of the distribution passages have substantially identical shapes. The manifold may have mounting means disposed on the opposite ends thereof each of which is adapted to receive a compound carburetor. Each of the distribution passages may have substantially straight and parallel center portions which communicate with the primary and secondary mixture supply passages of the carburetors. In order to provide the desired grouping of the cylinders, it may be necessary that the distribution passages be crossed. In order to accomplish this, it is proposed to maintain the center portions of the distribution passages parallel and cross the end portions thereof on one side of the center portions.

During certain periods of operation it may be desirable to heat the walls of the distribution passages in the manifold so as to improve the vaporization of the fuel particles. However at other times, in order to obtain maximum engine output, it may be desirable to prevent any heating of the manifold as this results in heating the charge and reducing the volumetric efficiency.

It is proposed to provide an intake manifold having an exhaust crossover passage that extends transversely therethrough. A pair of exhaust ports may be positioned in the opposite sides of the manifold so as to receive hot exhaust gases and direct them into the crossover passage. The crossover passage is to be positioned so that exhaust gases will be in heat exchanging relation with the walls of the distribution passages in the manifold. Manually operated valve means may be disposed in the exhaust crossover passage adjacent each of the exhaust ports to positively control the flow of exhaust gases therethrough. Thus if it is desired to completely eliminate the flow of exhaust gases through the manifold, the valves may be closed without removing the manifold and employing a new manifold gasket.

In the three sheets of drawings:

Fig. 1 is a plan view of a manifold employing the present invention, portions thereof being broken away to more clearly show the details thereof.

Fig. 2 is a side view of the manifold of Fig. 1, portions thereof being broken away.

Fig. 3 is a side elevational view of an engine employing the manifold of Fig. 1.

Figure 4:
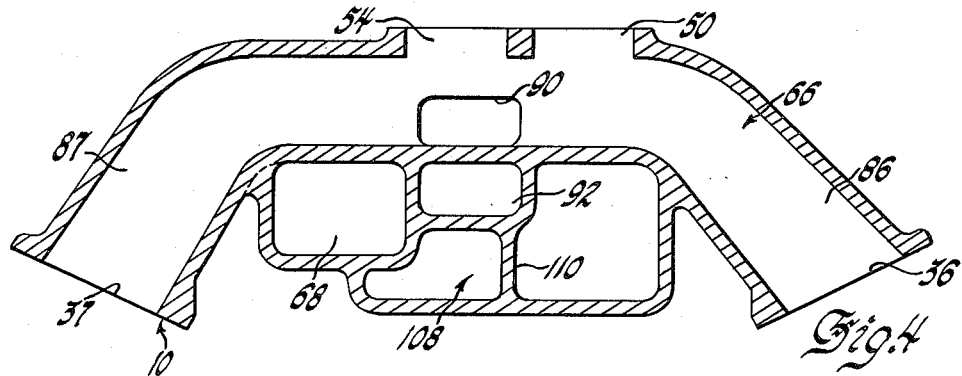
Fig. 4 is a cross sectional view taken substantially along the plane of line 4—4 in Fig. 1.
Figure 5:
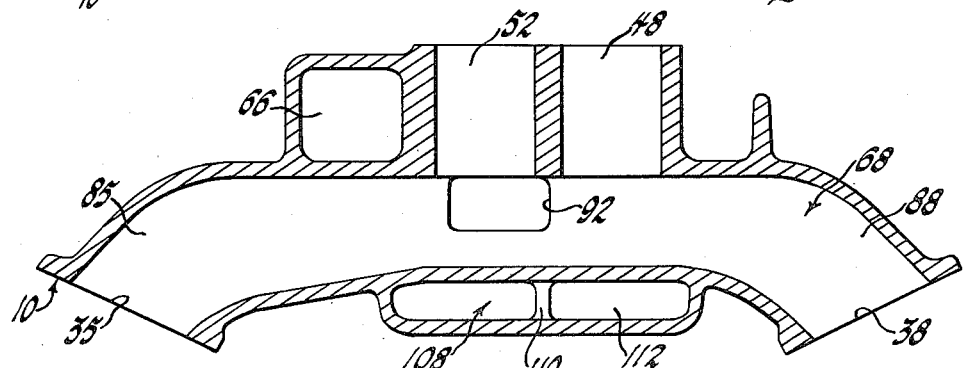
Fig. 5 is a cross sectional view taken substantially along the plane of line 5—5 in Fig. 1.
Figure 6:
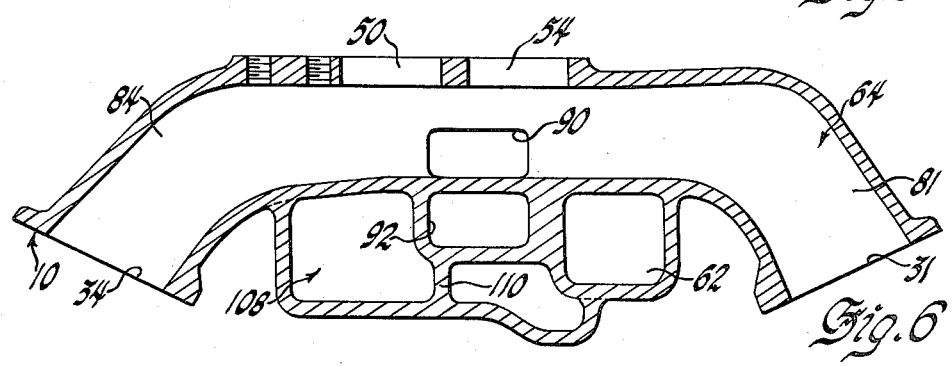
Fig. 6 is a cross sectional view taken substantially along the plane of line 6—6 in Fig. 1.
Figure 7:
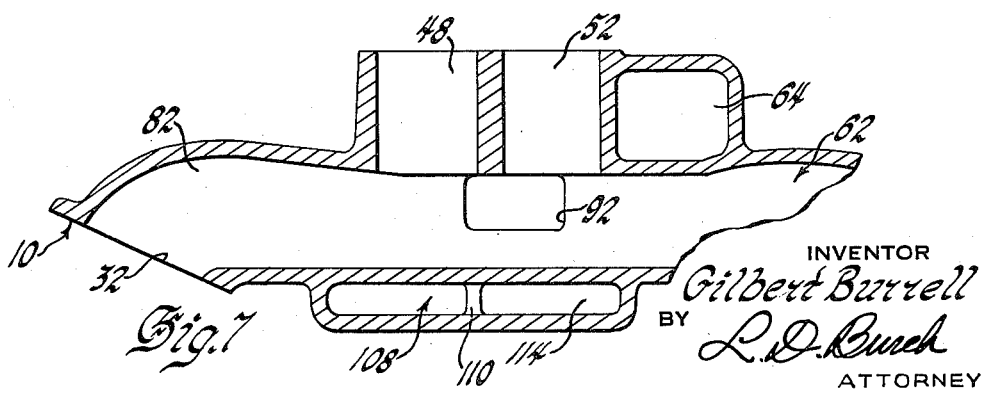
Fig. 7 is a cross sectional view taken substantially along the plane of line 7—7 in Fig. 1.

Referring to the drawings in more detail, the present invention may be embodied in any suitable intake manifold 10. In the present instance the intake manifold 10 is adapted for use on a so-called V-type engine 12. The engine 12 may have two banks 14 of cylinders that are angularly disposed with respect to each other and contain four cylinders in each bank. If the cylinders are numbered beginning with the left front cylinder and proceeding rearwardly and alternately from one bank to the other, the cylinders in the left bank will be numbered 1, 3, 5 and 7 and those in the right banks 2, 4, 6 and 8.

The manifold 10 comprises a member 16 which may be disposed between the banks 14 of cylinders and extend longitudinally of the engine 12. If desired the front end of the member 16 may have a transverse passage 18 adapted to collect the cooling water from each cylinder head 20 and discharge the cooling water from the hose fitting 22 into a hose connected to the radiator header. The member 16 may have two rows 24 and 26 of discharge ports 31, 32, 33, 34, 35, 36, 37 and 38 positioned so that the rows 24 and 26 extend along the opposite sides thereof. Each row preferably contains a pair of end ports 31 and 37 or 32 and 38 and a pair of center ports 33 and 35 or 34 and 36, each of which is adapted to communicate with one of the cylinders in the bank adjacent thereto.

Mounting means 40 and 42 may be provided on each end of the member 16 for receiving suitable carburetors 44 and 46. In the present instance a pair of downdraft compound carburetors are employed, each of which has a pair of vertical primary mixture passages and a pair of vertical secondary mixture passages. Each of the mounting means 40 and 42 may have a pair of primary 48 and 50 and a pair of secondary 52 and 54 supply passages extending vertically therethrough so as to register with a corresponding passage in the carburetors 44 and 46. Preferably the primary passages 48 and 50 are disposed on one side of the manifold 10 and the secondary passages 52 and 54 are disposed on the other side of the manifold 10.

In order to conduct the fuel charge from the mixture supply passages to the cylinders in the engine, a set 56 and 58 of distribution passages 62, 64, 66 and 68 may be provided for each of the carburetors 44 and 46. Each of the distribution passages is preferably identical in that they have substantially straight center portions 72, 74, 76 and 78 and a pair of substantially identical reversely curved end portions 81, 82, 83, 84, 85, 86, 87 and 88. Each of these end portions extend from the ends of the center portions to one of the ports. In order to facilitate making the resistance of each distribution passage 62, 64, 66 and 68 the same, it is desirable that each of the end portions 81, 82, 83, 84, 85, 86, 87 and 88 have a reverse curve that is substantially the same size and shape as all of the other end portions.

In order to obtain the desired engine operating characteristics, it is frequently desirable to divide the cylinders into two separate groups and employ independent induction systems for each group. When a firing order such as 1, 8, 7, 3, 6, 5, 4, 2 is employed, the cylinders may be divided into two groups with two end cylinders on one side and two center cylinders on the other side in each group. In other words cylinders 1, 4, 6 and 7 will be in one group and cylinders 2, 3, 5 and 8 will be in the other group. Accordingly, each set 56 and 58 of distribution passages may include a pair of distribution passages with each of the passages extending transversely of the manifold so as to communicate with an end port on one side of the manifold 10 and a center port on the other side. Thus there are four separate distribution passages with distribution passage 62 interconnecting ports 32 and 33, passage 64 interconnecting ports 31 and 34, passage 66 interconnecting ports 36 and 37, and passage 68 interconnecting ports 35 and 38.

To obtain such a grouping of cylinders it may be noted that it is desirable to have the distribution passages in each set 56 and 58 crossed. In order to facilitate providing each of the distribution passages 62, 64, 66 and 68 with substantially identical flow resistances, it is preferable that the center portions 72, 74, 76, and 78 of each passage be substantially straight and parallel with the center portion of the other passage in said pair. In addition, it is desirable that the primary 48 and 50 and secondary 52 and 54 supply passages for each distribution passage 62, 64, 66 and 68 communicate with the center portion 72, 74, 76 and 78 thereof. The distribution passages in each set 56 and 58 may be crossed by having the end portions 81 and 83 and 85 and 87 on one side of the center portions crossed and those 82 and 84 and 86 and 88 on the other side thereof substantially parallel or uniformly spaced from each other. This will result in the end portions being positioned to form a pair of generally U-shaped passages 62 and 66 and a pair of generally S-shaped passages 64 and 68. Even though the passages 62, 64, 66 and 68 have different shapes due to the fact that some of the reverse curves of the end portions 81 through 88 are disposed in opposite directions, it should be noted that since each of the reversely curved end portions are substantially identical in size and shape, the flow resistance from any of the supply passages 48, 50, 52 and 54 to their associated ports 31 through 38 will be substantially identical for all of the distribution passages 62, 64, 66 and 68. In order to permit the end portions to cross without intersecting each other, distribution passages 64 and 66 may be disposed above passages 62 and 68.

In order to insure that substantially the same conditions exist in each of the distribution passages 62, 64, 66 and 68, suitable balance passage means may be provided for interconnecting the distribution passages. In the present instance there are two separate balance passages 90 and 92 which extend longitudinally of the manifold 10. The balance passages 90 and 92 may be substantially parallel to each other and disposed one above the other. The upper balance passage 90 may be positioned to intersect the center portions 74 and 76 of distribution passages 64 and 66 adjacent the outlet ends of the primary 50 and secondary 54 supply passages. The lower balance passage 92 may be entirely independent of the upper balance passage 90 and it may be positioned to intersect distribution passages 62 and 68 adjacent the outlet ends of the primary 48 and secondary 52 supply passages. Thus it may be seen that ports 31, 34, 36 and 37 are all interconnected by distribution passages 64 and 66 and the upper balance passage 90 while ports 32, 33, 35 and 38 are in a separate and independent group interconnected by distribution passages 62 and 68 and the lower balance passage 92.

In order to insure better atomization of the fuel particles, it may be desirable to heat the walls of the passages in the manifold 10, particularly when the engine 12 is operating at sub-normal temperatures. If the walls of the center portions 72, 74, 76 and 78 are heated, any fuel particles which precipitate out of the charge onto the walls will be immediately vaporized back into the charge. A convenient means for accomplishing this is to employ an exhaust crossover passage 94 that extends through the member 16 so as to utilize the hot engine exhaust gases for heating the manifold 10. In the present instance exhaust ports 96 and 98 are disposed on the opposite sides of the member 16 between each of the center ports 34 and 36 and 33 and 35 so as to register with discharge ports in the cylinder heads 20. Thus when the thermostatically controlled heat valve 100 in the exhaust manifold 102 is closed during cold engine temperatures, the hot exhaust gases will back up through a cylinder head 20 and flow into the crossover passage 94. The crossover passage 94 may include short ducts 104 and 106 at each end that connect the exhaust ports 96 and 98 with an enlarged chamber 108 that extends longitudinally of the manifold 10. A baffle 110 may extend longitudinally of the chamber 108 so as to divert the flow of exhaust gases into the opposite ends 112 and 114 of the chamber. The chamber 108 may be disposed beneath the balance passages 90 and 92 with the ends 112 and 114 thereof disposed below the intersections of the distribution passages 62, 64, 66 and 68 with the primary 48 and 50 and secondary 52 and 54 supply passages. Thus when the exhaust gases are diverted into the ends 112 and 114 of the chamber 108, the walls of the center portions 72, 74, 76 and 78 will be heated sufficiently to vaporize any fuel particles that precipitate out of the charge.

Even though the heat control valve 100 will open when the engine 12 is warmed up to its proper operating temperatures, there may still be a flow of hot exhaust gases through the crossover passage 94. To obtain maximum output from the engine 12, it may be desirable to prevent any heating of the manifold 10 as this heats the charge and reduces the volumetric efficiency. Although the manifold 10 may be removed and a gasket substituted which will block the exhaust ports 96 and 98, it has been found more convenient to employ manually operated valve means 120 and 122 in each of the ducts 104 and 106. In the present instance each valve 120 and 122 includes a plate 124 and 126 which may be secured over an aperture 128 in the manifold by bolts 130. The plates 124 and 126 may have a vane 132 depending therefrom so as to project downwardly through the aperture 128. When in the on position, this vane 132 will be parallel to the flow of gases and will not interfere therewith. However, when it is in the off position, the vane 132 will cooperate with the partitions 134 and 136 and completely block the flow of any exhaust gases through the ducts 104 and 106.

It is to be understood that, although the invention has been described with specific reference to a particular embodiment thereof, it is not to be so limited since changes and alterations therein may be made which are within the full intended scope of this invention as defined by the appended claims.

What is claimed is:

1. An intake manifold for an internal combustion engine comprising a member having pairs of distribution passages extending transversely therethrough to form outlet ports in the opposite sides of said member for communication with the cylinders of the said engine, each of said distribution passages having center portions and end portions on the opposite sides thereof, and primary and secondary mixture supply passages communicating with each of said center portions, said end portions on one side of said center portion being substantially parallel and said end portions on the opposite side thereof being crossed.

2. An intake manifold for an internal combustion engine comprising a member having pairs of distribution passages extending transversely therethrough to form outlet ports in the opposite sides of said member for communication with the cylinders of said engine, each of said distribution passages having substantially parallel center portions and reversely curved end portions extending substantially transversely therefrom to communicate with said outlet ports, each of said pairs having the end portions on one side of said center portions substantially parallel to each other and the end portions on the opposite side thereof crossed.

3. An intake manifold for an internal combustion engine comprising a member having sets of distribution passages extending transversely therethrough, rows of outlet ports in the opposite sides of said member adapted for communication with the cylinders of said engine, each of said rows including a pair of end ports and a pair of center ports, each of said sets including a first and a second distribution passage having substantially parallel center portions and reversely curved end portions extending substantially transversely therefrom to communicate with said outlet ports, one of the end portions of each of said first and second distribution passages being substantially parallel to each other and communicating respectively with an end port and a center port on one of said sides of said member, the other of said end portions of each of said first and second distribution passsages being crossed and communicating respectively with a center port and an end port on the other of said sides of said member, and a mixture supply passage communicating with each of said center portions.

4. An intake manifold for an internal combustion engine comprising a member having sets of distribution passages extending transversely therethrough, rows of outlet ports in the opposite sides of said member adapted for communication with the cylinders of said engine, each of said rows including a pair of end ports and a pair of center ports, each of said sets including a first and a second distribution passage having substantially parallel center portions and reversely curved end portions extending substantially transversely therefrom to communicate with said outlet ports, one of the end portions of each of said first and second distribution passages being substantially parallel to each other and communicating respectively with an end port and a center port on one of said sides of said member, the other of said end portions of each of said first and second distribution passages being crossed and communicating respectively with a center port and an end port on the other of said sides of said member, balance passages interconnecting the distribution passages of one set with the distribution passages of the other set, and a primary and a secondary supply passage communicating with each of said center portions.

5. An intake manifold for an engine comprising a member having a row of ports on opposite sides thereof, each of said rows including a pair of end ports and a pair of center ports, two pairs of distribution passages extending transversely of said member, each of said distribution passages including end portions and a substantially transverse center portion parallel to the center portion of the other distribution passage in said pair, one of said end portions of each of said distribution passages communicating with one of said end ports on one side of said member and the other of said end portions of said distribution passage communicating with a center port on the opposite side of said member, and a mixture supply passage communicating with each of said center portions.

6. An intake manifold for an internal combustion engine having angularly disposed banks of cylinders comprising a member adapted to be disposed between said banks and having a row of aligned ports on opposite sides thereof, the ports on each of said sides being adapted for communication with the cylinders in the bank adjacent thereto, pairs of distribution passages extending transversely of said member, each of said passages including a center portion and end portions interconnecting said center portion with a port on each side of said member, the distribution passages in each of said pairs having the center portions and the end portions on one side thereof substantially parallel and having the end portons on the other side thereof crossed, and a mixture supply passage communicating with said center portions.

7. An intake manifold for an internal combustion engine having angularly disposed banks of cylinders comprising a member adapted to be disposed between said banks and having a row of aligned ports on opposite sides thereof, the ports on each of said sides being adapted for communication with the cylinders in the bank adjacent thereto, pairs of distribution passages extending transversely of said member, each of said passages including a center portion and end portions interconnecting said center portion with a port on each side of said member, the distribution passages in each of said pairs having the center portions and the end portions on one side thereof substantially parallel and having the end portions on the other side thereof crossed, and a mixture supply passage communicating with said center portions, balance passage means extending longitudinally of said manifold to interconnect the center portions of said distribution passages of one pair with those of the other pair and primary and secondary supply passages communicating with each of said center portions.

8. An intake manifold for an internal combustion engine having two angularly disposed banks of four cylinders each, said manifold comprising a member adapted to be disposed between said banks and having a row of ports on the opposite sides thereof adapted for communication with the cylinders in the bank adjacent thereto, each of said rows including a pair of end ports and a pair of center ports, sets of distribution passages extending transversely of said member to interconnect an end port on one side of said member with a center port on the other side of said member, each of said sets including a pair of distribution passages having parallel center portions with the end portions on one side thereof being substantially parallel and the end portions on the other side thereof being crossed and primary and secondary supply passages communicating with each of said center portions.

9. An intake manifold for an internal combustion engine having two angularly disposed banks of four cylinders each, said manifold comprising a member adapted to be disposed between said banks and having a row of ports on the opposite sides thereof adapted for communication with the cylinders in the bank adjacent thereto, each of said rows including a pair of end ports and a pair of center ports, two pairs of distribution passages extending transversely of said manifold, each of said distribution passages having a center portion parallel to the center portion of the other passage in said pair and end portions interconnecting said center portion with an end port on one side of said member and a center port on the opposite side of said member, and a primary and a secondary supply passage communicating with each of said center portions.

10. An intake manifold for an internal combustion engine having two angularly disposed banks of four cylinders each, said manifold comprising a member adapted to be disposed between said banks and having a row of ports on the opposite sides thereof adapted for communication with the cylinders in the bank adjacent thereto, each of said rows including a pair of end ports and a pair of center ports, two pairs of distribution passages extending transversely of said manifold, each of said distribution passages having a center portion parallel to the center portion of the other passage in said pair and end portions interconnecting said center portion with an end port on one side of said member and a center port on the opposite side of said member, a primary and a secondary supply passage communicating with each of said center portions and balance passage means interconnecting the distribution passages of one pair with those of the other pair.

11. An intake manifold for an internal combustion engine having two angularly disposed banks of four cylinders each, said manifold comprising a member having a row of ports on the opposite sides thereof adapted for communication with the cylinders in the bank adjacent thereto, each of said rows including a pair of end ports and a pair of center ports, a substanially U-shaped distribution passage disposed adjacent each end of said members, each of said U-shaped distribution passages interconnecting an end port on the one side of said member with a center port on the other side of said member, a substantially S-shaped distribution passage disposed adjacent each of said U-shaped distribution passages, each of said S-shaped distribution passages interconnecting the other of said center ports on one of said sides with the other of said end ports on the other of said sides, a primary and a secondary mixture supply passage communicating with each of said distribution passages, and a pair of separate balance passages extending longitudinally of said member to interconnect said distribution passages.

12. An intake manifold for an internal combustion engine having two angularly disposed banks of four cylinders each, said manifold comprising a member having a row of ports on the opposite sides thereof adapted for communication with the cylinders in the bank adjacent thereto, each of said rows including a pair of end ports and a pair of center ports, a substantially U-shaped distribution passage disposed adjacent each end of said member, each of said U-shaped distribution passages interconnecting an end port on one side of said member with a center port on the other side of said member, a substantially S-shaped distribution passage disposed adjacent each of said U-shaped distribution passages, each of said S-shaped distribution passages interconnecting the other of said center ports on one of said sides with the other of said end ports on the other of said sides, and a primary and a secondary mixture supply passage communicating with each of said distribution passages.

13. An intake manifold for an internal combustion engine comprising a member having pairs of distribution passages extending transversely therethrough to form outlet ports in the opposite sides of said member for communication with the cylinders of said engine, the distribution passages in each of said pairs having substantially parallel center portions, primary and secondary mixture supply passages communicating with said center portions of each of said distribution passages, the end portions of said distribution passages on one side of said center portion being substantially parallel and the end portions on the oppostie side thereof being crossed, and heating means disposed in heat exchanging relation with said center portions of said distribution passages.

14. An intake manifold for an engine comprising a member having a row of ports on opposite sides thereof, each of said rows including a pair of end ports and a pair of center ports, two pairs of distribution passages extending transversely of said member, each of said distribution passages including end portions and a center portion substantially parallel to the center portion of the other distribution passage in said pair, one of said end portions of each of said distribution passages communicating with one of said end ports on one side of said member and the other of said end portions communicating with the center port on the opposite side of said member, a primary and a secondary supply passage communicating with each of said center portions, and heating means disposed in heat exchanging relation with said center portions.

15. An intake manifold for an engine comprising a member having a row of ports on opposite sides thereof, each of said rows including a pair of end ports and a pair of center ports, two pairs of distribution passages extending transversely of said member, each of said distribution passages including end portions and a center portion substantially parallel to the center portion of the other distribution passage in said pair, one of said end portions of each of said distribution passages communicating with one of said end ports on one side of said member and the other of said end portions communicating with the center port on the opposite side of said member, a primary and a secondary supply passage communicating with each of said center portions, heating ports disposed in each of said sides between said center ports, and a heating duct interconnecting said heating ports and having portions thereof disposed in heat exchanging relation with the surface of said center portions.

16. An intake manifold for an internal combustion engine having two angularly disposed banks of four cylinders each, said manifold comprising a member adapted to be disposed between said banks and having a row of ports on the opposite sides thereof adapted for communication with the cylinders adjacent thereto, each of said rows including a pair of end ports and a pair of center ports, two pairs of distribution passages extending transversely of said manifold, each of said distribution passages having a center portion parallel to the center portion of the other passage in said pair, end portions interconecting said center portions with an end port on one side of said member and a center port on the opposite side of said member, a primary and a secondary supply passage communicating with each of said center portions, an exhaust port disposed on each of said sides between said center ports adapted for receiving exhaust gases from said engine and a heating duct interconnecting said exhaust ports and being disposed to conduct said exhaust gases into heat exchanging relation with the surfaces of said center portions.

17. An intake manifold for an internal combustion engine having two angularly disposed banks of four cylinders each, said manifold comprising a member adapted to be disposed between said banks and having a row of ports on the opposite sides thereof adapted for communication with the cylinders adjacent thereto, each of said rows including a pair of end ports and a pair of center ports, two pairs of distribution passages extending transversely of said manifold, each of said distribution passages having a center portion parallel to the center portion of the other passage in said pair, end portions interconnecting said center portion with an end port on one side of said member and a center port on the opposite side of said member, balance passage means interconnecting the distribution passages of one pair with those of the other pair, exhaust ports disposed on the opposite sides of said member between said center ports adapted for receiving exhaust gases from said cylinders, a chamber interconnecting said exhaust ports and being adapted for carrying exhaust gases in heat exchanging relation with said balance passages and said center portions, and a partition in said chamber extending longitudinally thereof for diverting the flow of exhaust gases therethrough to the ends of said chamber.

18. An intake manifold for an internal combustion engine having two angularly disposed banks of four cylinders each, said manifold comprising a member adapted to be disposed between said banks and having a row of ports on the opposite sides thereof adapted for communication with the cylinders adjacent thereto, each of said rows including a pair of end ports and a pair of center ports, two pairs of distribution passages extending transversely of said manifold, each of said distribution passages having a center portion parallel to the center portion of the other passage in said pair, end portions interconnecting said center portion with an end port on one side of said member and a center port on the opposite side of said member, balance passage means interconnecting the distribution passages of one pair with those of the other pair, a chamber extending longitudinally of said member in heat exchanging relation with said balance passages and said center portions, ducts extending from the opposite sides of said chamber to form ports in said sides of said member for receiving the exhaust gases from said engine, and a partition in said chamber and extending longitudinally thereof for diverting the flow of exhaust gases therethrough to the ends of said chamber, and valve means disposed in said ducts adjacent said ports for preventing the flow of exhaust gases therethrough.

19. An intake manifold for an engine comprising a member having pairs of distribution passages extending transversely therethrough, each of said distribution passages including a substantially transverse center portion parallel to the center portion of the other distribution passage in said pair and a pair of end portions, one of said end portions in each distribution passage forming a port adjacent an end of one side of said member and the other of said end portions in said distribution passage forming a center port on the opposite side of said member, a mixture supply passage communicating with each of said center portions, and a pair of substantially straight balance passages disposed one above the other and extending longitudinally of said member, each of said balance passages interconnecting the center portion of a distribution passage in one pair with the center portion of a distribution portion in another pair.

20. An intake manifold for an engine comprising a member having pairs of distribution passages extending transversely thereof, each of said distribution passages including a substantially transverse center portion parallel to the center portion of the other distribution passage in said pair and end portions, one of said end portions of each of said distribution passages forming a port adjacent an end of one side of said manifold and the other of said end portions of said distribution passage forming a center port on the opposite side of said member, a mixture supply passage communicating with each of said center portions, balance passages interconnecting a center portion of a distribution passage in one pair with the center portion of a distribution passage in the other pair, a heating duct extending through said member in heat exchanging relation with said balance passages and said distribution passages and forming heating ports in said opposite sides of said member, and valves disposed in said duct adjacent each of said heating ports.

References Cited in the file of this patent

UNITED STATES PATENTS 2,135,628    Smith _____ Nov. 8, 1938